United States Patent
Jonsson

[15] 3,700,845
[45] Oct. 24, 1972

[54] WIRE RACE BALL BEARING

[72] Inventor: Karl-Erik Arnold Jonsson, Gavle, Sweden

[73] Assignee: Brundell och Johsson AB, Gavle, Sweden

[22] Filed: June 22, 1971

[21] Appl. No.: 155,543

[30] Foreign Application Priority Data

June 24, 1970   Sweden .....................8737/70

[52] U.S. Cl. ................................................308/216
[51] Int. Cl. ..............................................F16c 33/58
[58] Field of Search......................308/196, 216, 235

[56] References Cited

UNITED STATES PATENTS 3,099,073   7/1963   Olson ........................308/216

Primary Examiner—Edgar W. Geoghegan
Assistant Examiner—Frank Susko
Attorney—Bauer and Goodman

[57] ABSTRACT

A wire race ball bearing containing two outer and two inner wire race rings, the distance between the inner races being smaller than the distance between the outer races, whereby the axes of rotation of the balls are kept unchanged when the bearing is subjected to an uneven axial load.

2 Claims, 3 Drawing Figures

3,700,845

WIRE RACE BALL BEARING

BACKGROUND OF THE INVENTION

The invention relates to a wire race ball bearing of the type which comprises a circular row of balls inserted in an annular ball cage between two outer and two inner wire rings slotted radially to be mounted in corresponding grooves in stator and rotor members. Further, each wire ring is provided with a ball race turned onto the balls and formed concave in cross section. Such ball bearings are especially used for rotors with great diameters.

In the prior art, the wire rings of a bearing are generally arranged symmetrically in relation to the balls, as seen in a cross section, and in any case the distance between the inner races has been equal to the distance between the outer races. In some fast moving machines the rotor may be supported by a single wire race ball bearing. If such a single bearing is subjected to a tipping or a tilting moment during the rotation, the load acting on the balls will change its direction two times at each revolution, so that the balls are rolling alternately along the one and the other of the two outer races. As the axes of rotation of the balls are thus reversed two times during a revolution, rapid sliding motions occur between the balls and the races, and by and by this increased friction causes a faceting of the balls, which involves risk of breakdown.

SUMMARY OF THE INVENTION

The invention has for its object to provide a wire race ball bearing which eliminates the difficulty mentioned above in that the axes of rotation of the balls are kept unchanged irrespective of tilting forces which may subject the inner rings to an axial load. For that purpose, the angle between the perpendicular center lines of the two inner races is 8°–50°, preferably 15°–25°, smaller than the angle between the perpendicular center lines of the two outer races.

DETAILED DESCRIPTION OF THE PREFERRED EMBODIMENT

The invention will be explained in more detail with reference to the accompanying drawings in which.

Figure 1:
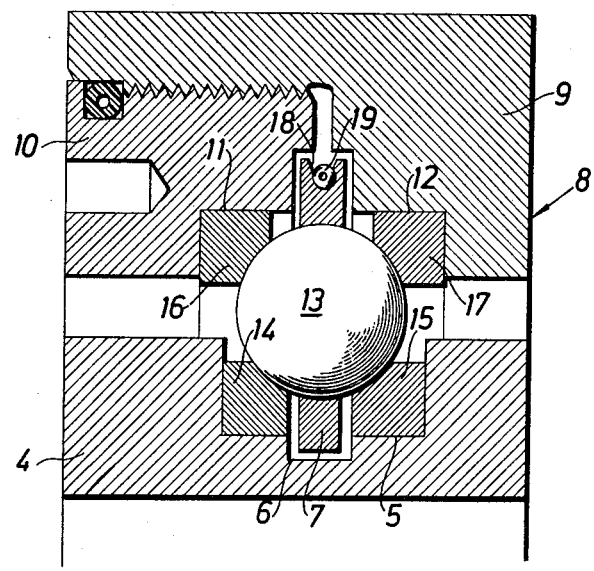
FIG. 1 shows a cross section through a preferred embodiment of the wire race ball bearing mounted between two concentric members, one of which is a rotor while the other is a stator.

In FIG. 1, 4 designates a cylindrical rotor ring. The exterior surface of this ring is formed with a peripheral groove 5 which is T-shaped in cross section. The deeper central portion 6 of this groove serves to receive the inner portion of a ball cage 7. The cylinder 4 is in spaced relationship surrounded by a coaxial cylinder 8 (a stator) composed by two rings; a first ring 9 L-shaped in cross section and threaded internally, and a second ring 10 threaded externally and screwed into said first ring. Opposite to the T-shaped groove 5,6 in the inner cylinder 4 the outer cylinder 8 has internally a corresponding T-shaped groove, one half 11 of which is formed in the ring 10, while the other half 12 is formed in the ring 9.

The ball bearing comprises a number of steel balls 13 which are supported by two wire rings 14,15 mounted in the groove 5 and two wire rings 16,17 mounted in the groove 11,12. As known in per se, the ball cage 7 retains the ball equally spaced in relation to each other. To enable the mounting the ball cage may consist of two semicircular portions which are held together by means of a circlip 19 introduced in a peripheral groove 18 in the outer surface of the cage.

Figure 2:
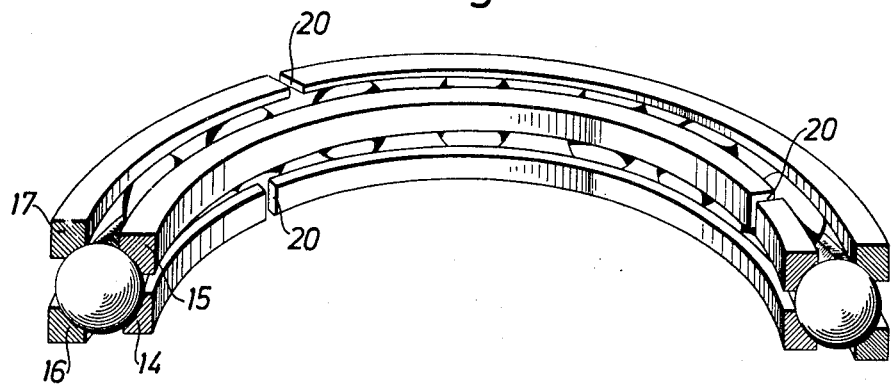
FIG. 2 shows a perspective view of a portion of the bearing, the ball cage being omitted.

As shown in FIG. 2, the wire rings 14–17 are slotted radially (at 20) to make possible the mounting in the grooves. Each ring has a rectangular or square cross section with a chamfered corner. The chamfer constitutes a circular ball race which is arcuate and concave in cross section in such a way that its radius is a little greater than the radius of the balls 13. The wire ring surfaces remote from the balls are supported by the bottoms and the side walls of the grooves 5,11,12, whereby the rings are effectively held in place.

According to the invention, the distance between the inner races is smaller than the distance between the outer races. This result is obtained by giving the grooves 5,11,12 and/or the rings 14–17 the required dimensions. As appears from FIG. 3, the angle $\alpha$ between the perpendicular center lines of the inner races is thus smaller than the angle $\beta$ between the perpendicular center lines of the outer races, and as mentioned above, the difference between said angles $\alpha$ and $\beta$ may vary from 8° to 50°, preferably between 15° and 25°. For many purposes a difference of about 20° between said angles has proved most suitable. The greater angle $\beta$ may preferably not exceed 120°.

Figure 3:
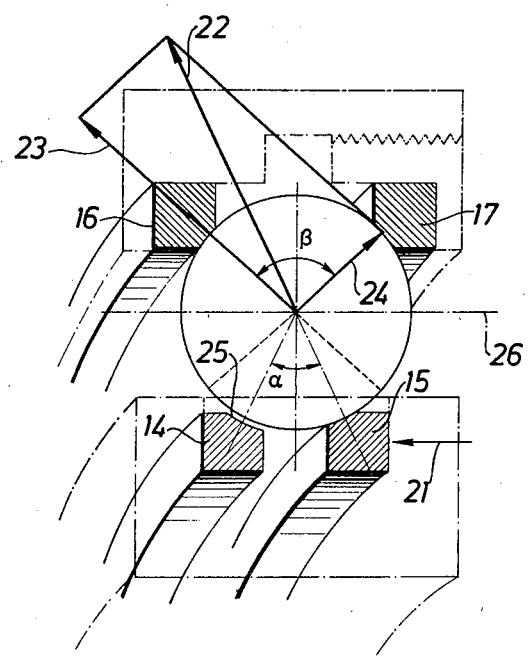
FIG. 3 is a diagrammatic view of a cross section in which the distribution of the forces is illustrated at a certain uneven load on the bearing.

In FIG. 3, it has been assumed that one of the inner race rings (the ring 15) is subjected to a tilting force directed axially, as indicated by the arrow 21. The ring 15 is thus pressed against the ball 13 by means of a force represented by vector 22 which is directed along the central perpendicular line of the race of said ring 15. The force 22 may be divided in two components; one 23 directed onto the outer race ring 16 along its central perpendicular line, and the other 24 directed onto the outer ring 17, also along the central perpendicular line. The force 22 acting on the ball 13 is thus divided such that the ball is kept in engagement with the two outer race rings, while a certain inevitable deformation may possibly cause a little clearance between the ball and the race of the ring 14. For the sake of clearness, this clearance is shown exaggerated in FIG. 3. The result of the distribution of force just described will thus be that, irrespective of the axial force 21 acting on the inner ring 15, the ball 13 will continue to rotate about an axis 26 in parallel to the axis of the rotor 4.

If the distance between the outer races had been equal to the distance between the inner races, the force 22 would have been transferred to the race of the ring 16 directly, so that no division into force components would have occurred. In such a case, the ball would have begun to rotate about an axis perpendicular to a central perpendicular line common to the races of the two rings 15,16.

I claim:

1. A wire race ball bearing comprising a circular row of balls inserted in an annular ball cage between two outer and two inner wire rings which are slotted radially to be mounted in corresponding grooves in stator and rotor members, each wire ring being provided with a ball race turned towards the balls and formed with a surface which is concave in cross section, characterized in that the angle between the center lines perpendicular to the concave surfaces of the two inner races is by 8°–50 smaller than the angle between the center lines perpendicular to the concave surfaces of the two outer races, whereby the axes of rotation of the balls are kept substantially unchanged when tilting forces cause an axial load on one of the inner rings.

2. Ball bearing according to claim 1, wherein the difference in angles between the center lines is 15°–25°.

* * * * *